(12) United States Patent (10) Patent No.: US 12,664,959 B2
Kapinos et al. (45) Date of Patent: Jun. 23, 2026

(54) METHOD TO SAVE POWER ON PIXEL LIT DISPLAYS

(71) Applicant: Lenovo (Singapore) Pte. Ltd., Singapore (SG)

(72) Inventors: Robert J Kapinos, Morrisville, NC (US); Scott Li, Morrisville, NC (US); Russell S VanBlon, Morrisville, NC (US); Robert James Norton, Jr., Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 268 days.

(21) Appl. No.: 18/543,005

(22) Filed: Dec. 18, 2023

(65) Prior Publication Data

US 2025/0201209 A1 Jun. 19, 2025

(51) Int. Cl.
*G09G 5/02* (2006.01)
*G06V 10/764* (2022.01)

(52) U.S. Cl.
CPC ............. *G09G 5/02* (2013.01); *G06V 10/764* (2022.01); *G09G 2320/0666* (2013.01); *G09G 2330/021* (2013.01)

(58) Field of Classification Search
CPC ............ G09G 5/02; G09G 2320/0666; G09G 2330/021; G06V 10/764
See application file for complete search history.

(56) References Cited

U.S. PATENT DOCUMENTS

| | | | | |
|---|---|---|---|---|
| 2002/0047590 | A1* | 4/2002 | Kawano ................. | G06F 9/451 |
| | | | | 315/169.4 |
| 2006/0101293 | A1* | 5/2006 | Chandley .............. | G06F 1/3203 |
| | | | | 713/300 |
| 2014/0198984 | A1* | 7/2014 | Chen ....................... | G06T 7/001 |
| | | | | 382/167 |
| 2014/0229875 | A1* | 8/2014 | Li ............................ | G09G 5/10 |
| | | | | 715/771 |
| 2017/0132830 | A1* | 5/2017 | Ha .......................... | G06T 15/80 |

* cited by examiner

*Primary Examiner* — Yingchun He
(74) *Attorney, Agent, or Firm* — Osha Bergman Watanabe & Burton LLP

(57) ABSTRACT

A method, of operating a display of a computing system, includes: identifying a focused region and a non-focused region of an original image; transforming color values of pixels in the non-focused region from a full color gamut of the display to a power reduced color gamut; generating a remapped image by remapping the non-focused region of the original image with the transformed color values; and outputting the remapped image on the display with the full color gamut in the focused region and the power reduced color gamut in the non-focused region.

14 Claims, 12 Drawing Sheets

304b

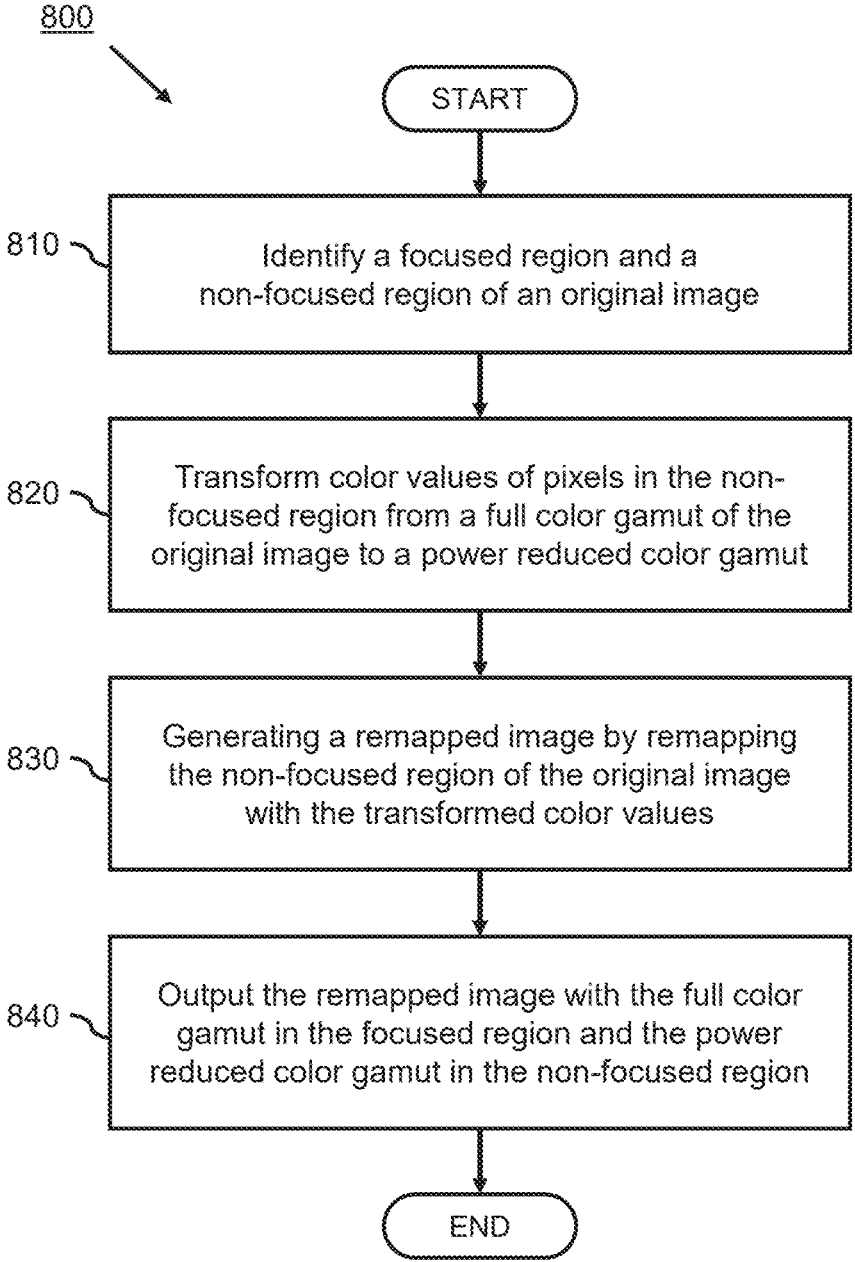

800

START

810 — Identify a focused region and a non-focused region of an original image

820 — Transform color values of pixels in the non-focused region from a full color gamut of the original image to a power reduced color gamut 830 — Generating a remapped image by remapping the non-focused region of the original image with the transformed color values 840 — Output the remapped image with the full color gamut in the focused region and the power reduced color gamut in the non-focused region

END

*FIG. 8*

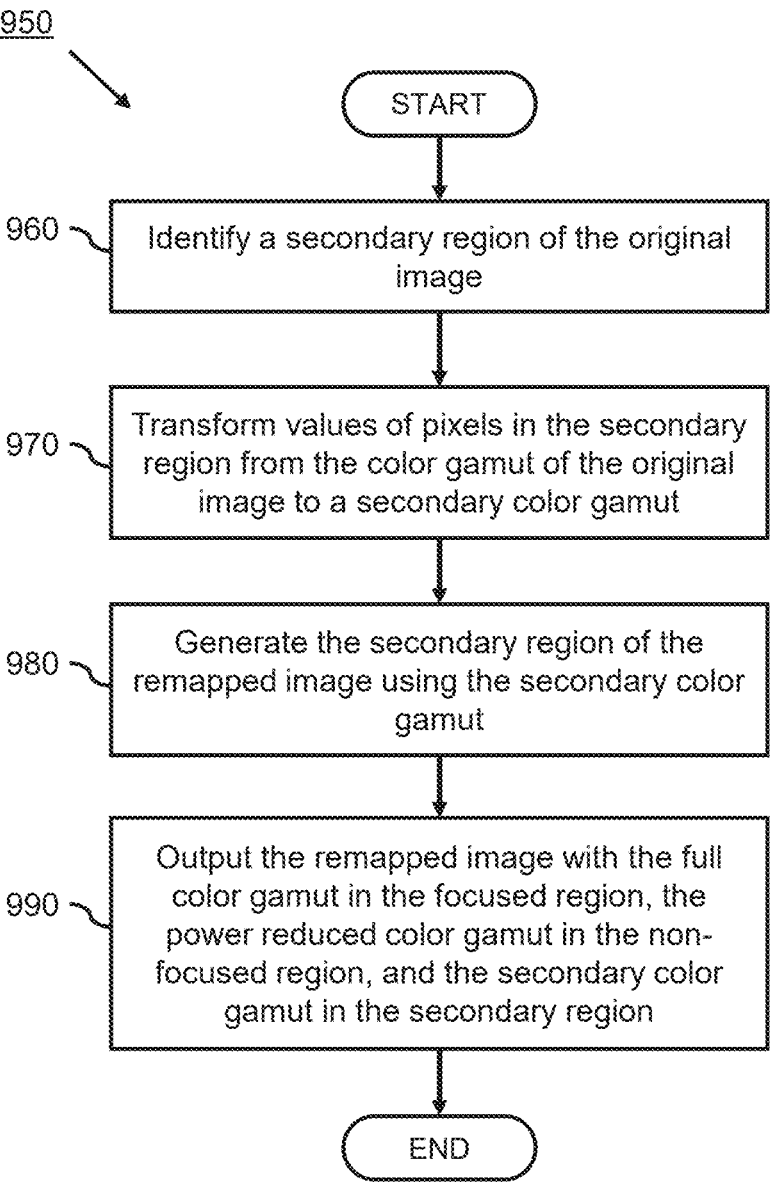
_FIG. 9B_

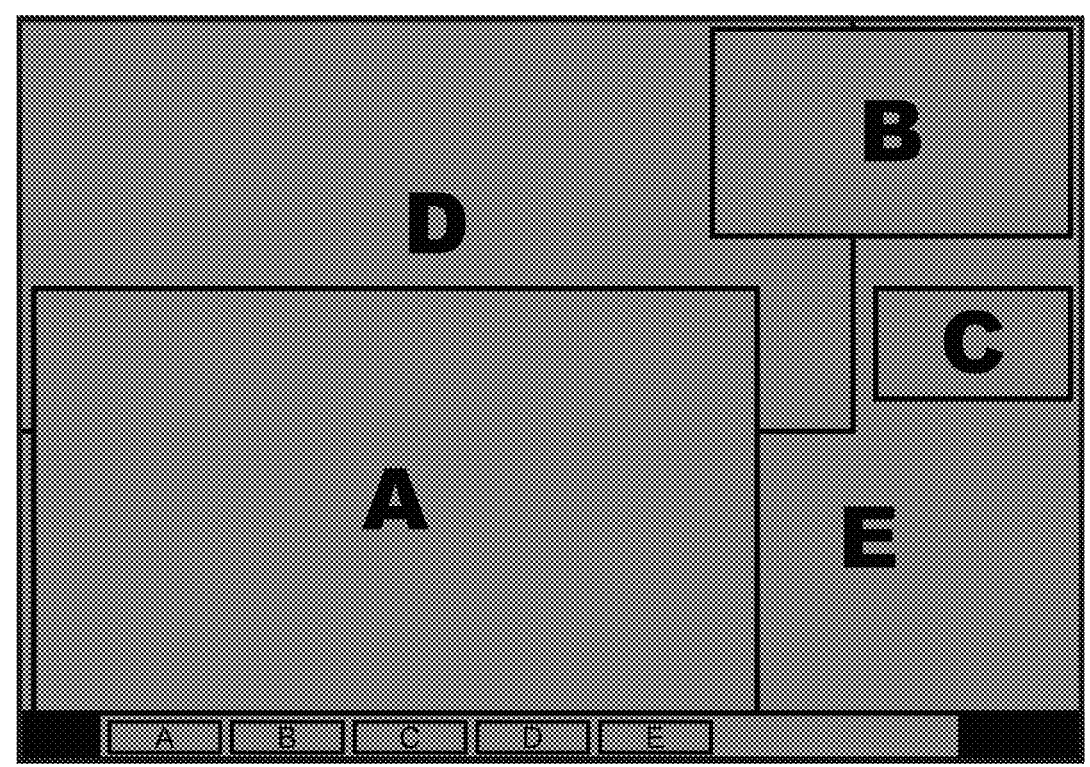
*- PRIOR ART -*
*FIG. 10*

METHOD TO SAVE POWER ON PIXEL LIT DISPLAYS

TECHNICAL FIELD

The present disclosure relates to a control method of a display in a computing system.

BACKGROUND

Computing systems operate at various power levels to emphasize performance or conservation of power (e.g., extend battery life). The display of the computing system (e.g., a liquid crystal display (LCD)) is typically the most power consuming unit of the computing system, regardless of the power level or operational mode of the computing system. To improve the user's experience of operating the computing system (e.g., increase battery life), methods of operating the display with less power and without impairing visual performance are desirable.

SUMMARY

In general, one or more embodiments of the invention relate to a method of operating a display of a computing system. The method includes: identifying a focused region and a non-focused region of an original image; transforming color values of pixels in the non-focused region from a color gamut of the original image to a power reduced color gamut; generating a remapped image by remapping the non-focused region of the original image with the transformed color values; and outputting the remapped image on the display with the color gamut in the focused region and the power reduced color gamut in the non-focused region.

In general, one or more embodiments of the invention relate to a non-transitory computer readable medium (CRM) storing computer readable program code for operating a display of a computing device, the computer readable program code causes the computing device to: identify a focused region and a non-focused region of an original image; transform color values of pixels in the non-focused region from a color gamut of the original image to a power reduced color gamut; generate a remapped image by remapping the non-focused region of the original image with the transformed color values; and output the remapped image on the display with the color gamut in the focused region and the power reduced color gamut in the non-focused region.

In general, one or more embodiments of the invention relate to a computer system comprising: a display; a processor coupled to the display. The processor is configured to: identify a focused region and a non-focused region of an original image; transform color values of pixels in the non-focused region from a color gamut of the original image to a power reduced color gamut; generate a remapped image by remapping the non-focused region of the original image with the transformed color values; and output the remapped image on the display with the color gamut in the focused region and the power reduced color gamut in the non-focused region.

Other aspects of the invention will be apparent from the following description and the appended claims.

BRIEF DESCRIPTION OF DRAWINGS

FIG. 8 shows a flowchart of a method in accordance with one or more embodiments of the invention.

FIGS. 9A-9B show flowcharts of methods in accordance with one or more embodiments of the invention.

FIG. 10 shows a comparative example of a dimmed image for a conventional backlight display.

DETAILED DESCRIPTION

Figure 1:
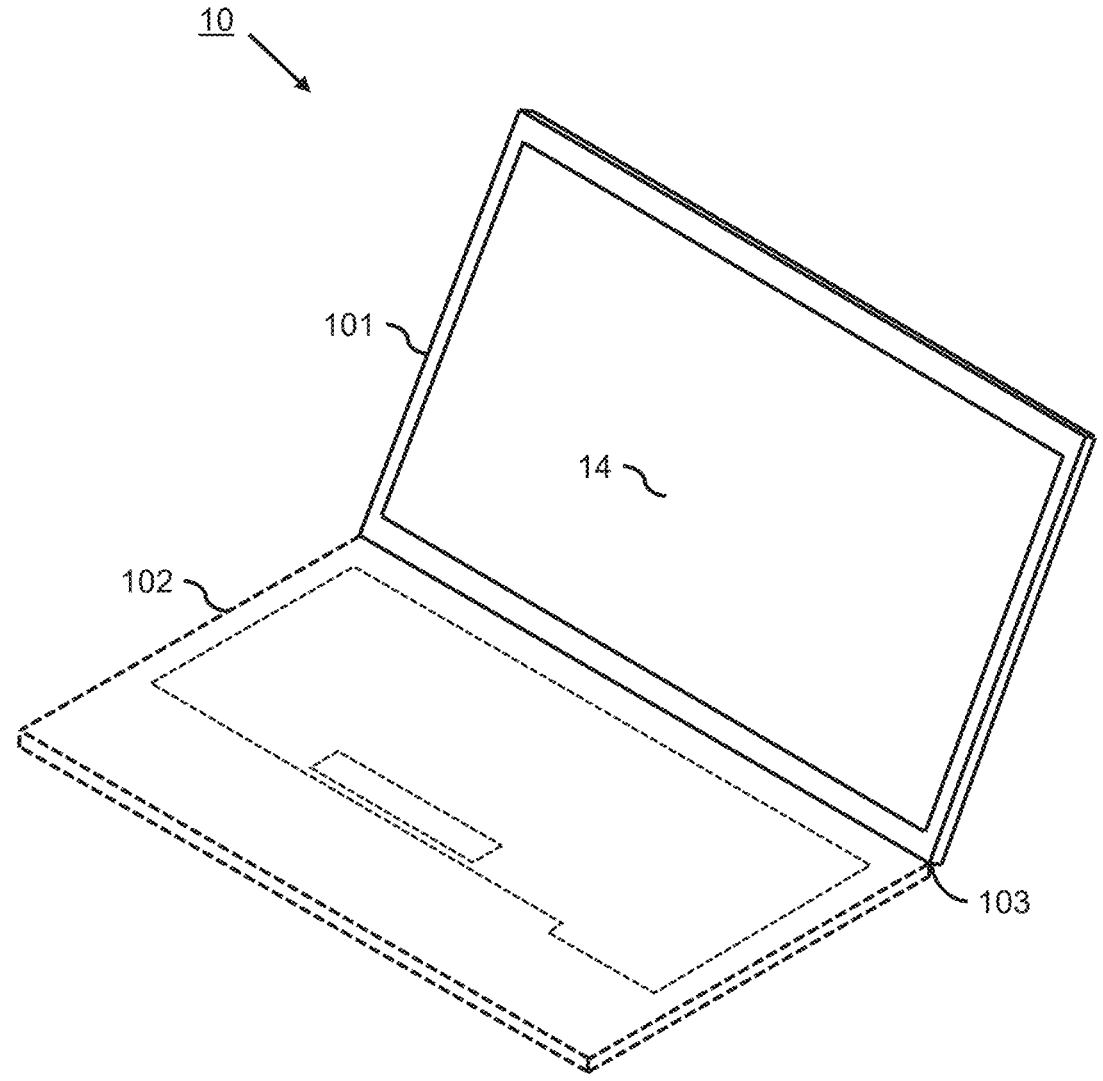
FIG. 1 shows a perspective view of a computing system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The display of the computing system is typically the most power consuming unit of the computing system. To reduce power consumption in a conventional device with liquid crystal display (LCD) screen 14', the backlight that illuminates the pixels is dimmed. As shown in FIG. 10, reducing backlight levels results in the overall luminance of the display 14' being capped at a lower level than during normal operation (e.g., display 14 shown in FIG. 4). While power savings are achieved with this conventional approach, the image quality suffers from the global dimming of all pixels. For example, an active window A on display 14' is dimmed during use which may cause discomfort or irritation in the user.

With the introduction of pixel lit display technologies (e.g., organic light emitting diode (OLED) displays), the conventional approach dimming the backlight is no longer applicable. Because each individual pixel of a pixel lit display acts as its own luminance source, a backlight may not be installed in the display. Therefore, the conventional backlight dimming approach is no longer applicable. However, because each individual pixel of a pixel lit display is addressable (i.e., to control the image on the display), new and improved power saving solutions are feasible.

In general, embodiments of the invention provide a method of reducing power usage of a display by adjusting a color range of non-focused portions of the display. Furthermore, embodiments of the invention produce higher fidelity images with better image quality compared to global dimming of all pixels in the pixel lit display.

In one or more embodiments, the onscreen elements of the display are analyzed and selectively processed with a color gamut transformation that reduces power consumption. By using a color gamut transformation, instead of a global pixel dimming approach, a higher degree of visual contrast is retained in the transformed elements. Furthermore, by applying one or more color gamut transformations selectively to uninteresting parts of the display (e.g., non-focused applications on the screen), the color gamut of the interesting parts of the display (e.g., the active applications or notification regions on the screen) may be preserved for an optimal user experience.

In one or more embodiments, the transformation may be executed in a window manager of the computing device such that no additional application or graphics hardware is required to execute embodiments of the claimed invention. In one or more embodiments, hardware accelerated transforms could be used to offload the processor (e.g., the central processing unit (CPU)).

FIG. 1 shows a perspective view of a computing system 10 in accordance with one or more embodiments of the invention.

The computing system 10 may be a personal computer (PC) (e.g., laptop PC, tablet PC, desktop PC, convertible PC) that includes a display portion 101 and a chassis portion 102. The display portion 101 may include a display 14 (e.g., a pixel addressable display, such as an OLED display) and one or more subcomponents (e.g., a processor coupled to the display, a user-facing camera/lights, indicator lights) (not shown). The chassis portion 102 may include a keyboard, a touchpad, a hinge mechanism 103 that connects to the display portion 101, and a variety of internal subcomponents, as described in detail below with respect to FIG. 2.

In one or more embodiments, the computing system 10 may only include a display portion 101 (e.g., a television display, an electronic sign, a digital picture frame). In other words, the computing system 10 may be any device that operates a display 14 (e.g., a device with a processor that controls a display screen).

Figure 2:
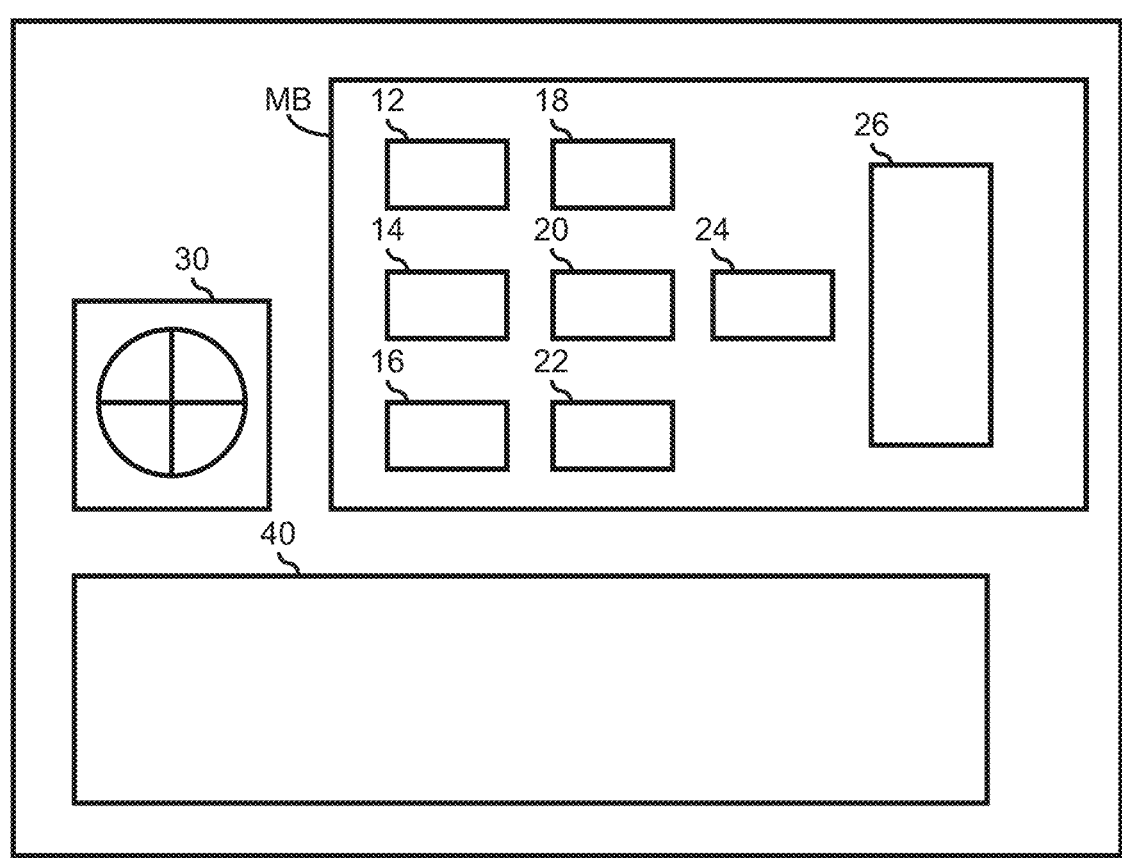
FIG. 2 shows a schematic of various subcomponents included in the computing system of FIG. 1 in accordance with one or more embodiments of the invention.

FIG. 2 shows a schematic of various subcomponents included in the computing system 10 of FIG. 1 in accordance with one or more embodiments of the invention.

In one or more embodiments with a computing system 10 that is a personal computing device, the chassis portion 102 may include a motherboard MB with a plurality of subcomponents. The subcomponents installed on the motherboard MB may include a central processing unit (CPU) 12, a memory 14, a graphic processing unit (GPU) 16 (e.g., a video subsystem), a chipset 18, a Basic Input Output System (BIOS) memory 20, an embedded controller 22, a power control circuit 24, and a storage device 26 (e.g., a hard disk drive (HDD), a solid state drive (SSD)). The chassis portion 102 may further include a fan 30 and a battery 40.

In one or more embodiments, the above subcomponents of the computing system 10 may be omitted, included in multiple quantities, combined as a single subcomponent (e.g., a processor that acts as a controller of one or more subcomponents), and/or disposed in other portions of the computing system 10. For example, in one or more embodiments with a stand-alone display 14, the above subcomponents may be disposed in the display portion 101. Furthermore, one or more of the components may be disposed in a connected computing device that communicates with the display 14 via an interface (e.g., a video port, a display port, a communication port, a wired and/or wireless communication interface).

Further, it will be appreciated that other subcomponents (e.g., USB devices, peripheral elements, removeable components, external power supplies) beyond those listed above may be included, internally or externally, as a subcomponent of the display portion 101 and/or the chassis portion 102 of the computing system 10 without departing from the scope of the present disclosure.

Figure 3:
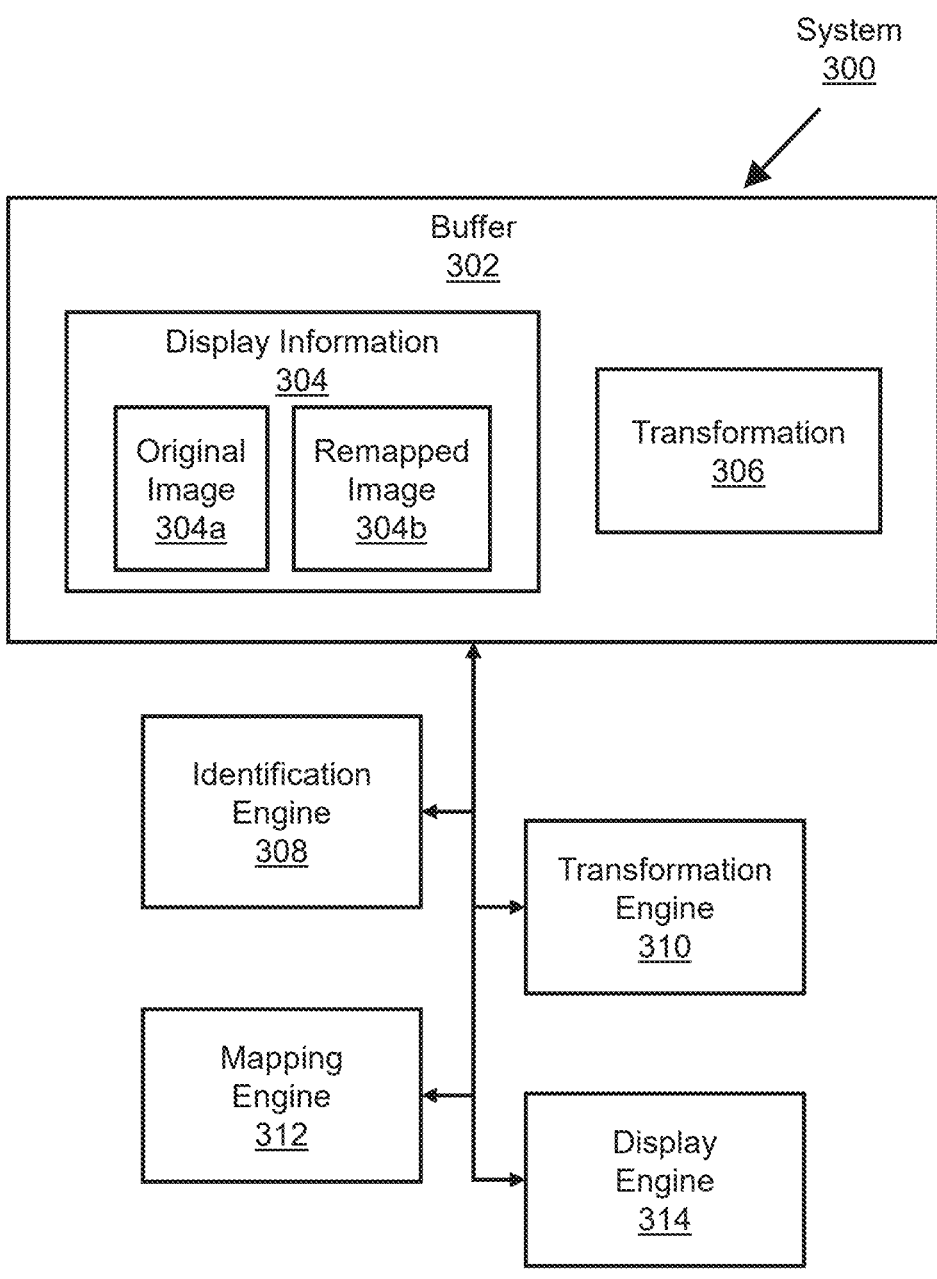
FIG. 3 shows a functional schematic of the computing system of FIG. 1 in accordance with one or more embodiments of the invention.

FIG. 3 shows a functional schematic of the computing system 10 of FIG. 1 in accordance with one or more embodiments of the invention.

The functional system 300 has multiple functional components, including, for example, a buffer 302, an identification engine 308, a transformation engine 310, a mapping engine 312, and a display engine 314. Each of these functional components 302, 308, 310, 312, 314 may be realized by one or more physical subcomponents described above with respect to FIG. 2. Each of these functional components is discussed below.

The functional system 300 includes the buffer 302. The buffer 302 is configured to store information. The stored information may be generated, edited, and/or deleted by any other functional component of the functional system 300.

The buffer 302 may store one or more instances of display information 304. Display information 304 may include one or more original images 304a (e.g., a rendered image of a desktop interface or any graphic) that is to be shown on the display 14 of the computing device 10. Furthermore, the display information 304 may include one or more remapped images 304b (e.g., a modified version of the original image 304a).

In one or more embodiments, the display information 304 may further include additional information about the original image 304a. For example, the display information 304 may include a classification of each element (e.g., window, taskbar, notification, image, object, menu) shown in the original image 304a. For example, the operating system or graphics driver of the computing device 10 may classify each element of the original image 304a based on the current power policy of the computation device 10. Accordingly, before each element is drawn, the element may be identified and modified based on its corresponding classification in the power policy. In one or more embodiments, the classification may be based on whether the element is part of a focused region (e.g., an actively used application) of the original image 304a or a non-focused region (e.g., a background application, a desktop image, a child application) of the original image 304a.

The buffer 302 may store one or more instances of a transformation 306. A transformation 306 is a defined relationship between two different systems (e.g., a coordinate space, a bit resolution).

In one or more embodiments, a transformation 306 may transform a pixel from one color gamut to a different color gamut (e.g., a different color space, a different range of a single color space (e.g., grayscale, RGB, HSV, HSL, CIELAB, CIELUV, or any defined color space). For example, the transformation 306 may convert each color channel of a pixel to a single value (e.g., one of the color channel values, an average of the color channels, a minimum or maximum of the color channel values) to produce a grayscale version of the original pixel.

In one or more embodiments, a transformation 306 may transform a pixel from an original bit depth to a lower bit depth. For example, a pixel with 8-bit resolution (i.e., 256 possible values ranging from 0 to 255) may be transformed to a lower bit depth (e.g., 7-bit resolution with possible values ranging from 0 to 127, 6-bit resolution with possible values ranging from 0 to 63, 5-bit resolution with possible values ranging from 0 to 31, 4-bit resolution with possible values ranging from 0 to 15, 3-bit resolution with possible values ranging from 0 to 7, 2-bit resolution with possible values ranging from 0 to 3, 1-bit resolution with possible values ranging from 0 to 1).

In addition, a transformation 306 may include a convolution of one or more separate transformations (e.g., scaling, offset, bit-shifting, truncation, concatenation). In one or more embodiments, the transformation 306 may be a mathematic function (e.g., formula or process applied to each pixel value) and/or a bitwise operation (e.g., logical shift, arithmetic shift applied to pixel bit value). For example, a single transformation 306 may include a grayscale transformation that is followed by a down sampling transformation that reduces the bit depth of the grayscale pixel.

The functional system 300 further includes the identification engine 308. The identification engine 308 is configured to select regions of the original image 304a and transformations 306 that are to be applied to each selected region.

In one or more embodiments, the identification engine 308 may select regions based on display information 304 (e.g., non-focused versus focused regions of the original image 304a). For example, the identification engine 308 may select regions based on a classification associated with each window shown in the original image 304a and the current power policy of the computing device 10.

In one or more embodiments, the identification engine 308 may select transformations 306 based on characteristics of the display 14 (e.g., resolution, bit depth, color space, calibration), display information (e.g., power classification options), user settings, or any combination of considerations.

The functional system 300 further includes the transformation engine 310. The transformation engine 310 is configured to apply a transformation 306 to one or more regions of the original image 304a. Based on the transformation 306 (e.g., selected by identification engine 308), the transformation engine 310 modifies one or more regions of the original image 304a in the buffer 302. In one or more embodiments, the transformation result may be temporarily saved in the buffer 302 or otherwise stored for later use by the functional system 300.

The functional system 300 further includes the mapping engine 312. Based on the output of the identification engine 308 and the transformation engine 310, the mapping engine 312 is configured to convert the original image 304a into the remapped image 304b. For example, the transformation result of the transformation engine 310 may be applied to the selected regions of the identification engine 308 to overwrite the original image 304a into the remapped image 304b. In one or more embodiments, the remapped image 304b is saved separately from the original image 304a.

The functional system 300 further includes the display engine 314. The display engine 314 is configured to output the remapped image 304b to the display 14. Based on the settings of the functional system 300, the display engine 314 may modify one or more settings of the computing device 10 and/or the display 14 (e.g., modify power settings, modify user accessibility settings).

Although the functional system 300 is shown as having five functional components 302, 304, 308, 310, and 312, in other embodiments of the invention, the functional system 300 may have more or fewer functional components. Furthermore, each functional component described above may be split across multiple functional components (e.g., provide instructions to one or more other functional components to change behavior) or combined into a single functional component. For example, the transformation engine 310 and mapping engine 312 may be combined if the transformation 306 is selected or generated to include the appropriate remapping process.

Furthermore, each functional component may be implemented in hardware (e.g., circuitry, physical components), software (e.g., machine code, programming on non-transitory computer readable media), or any combination thereof. In addition, each functional component may be utilized multiple times in a single computing system 10 (e.g., a device with multiple displays).

Figure 4:
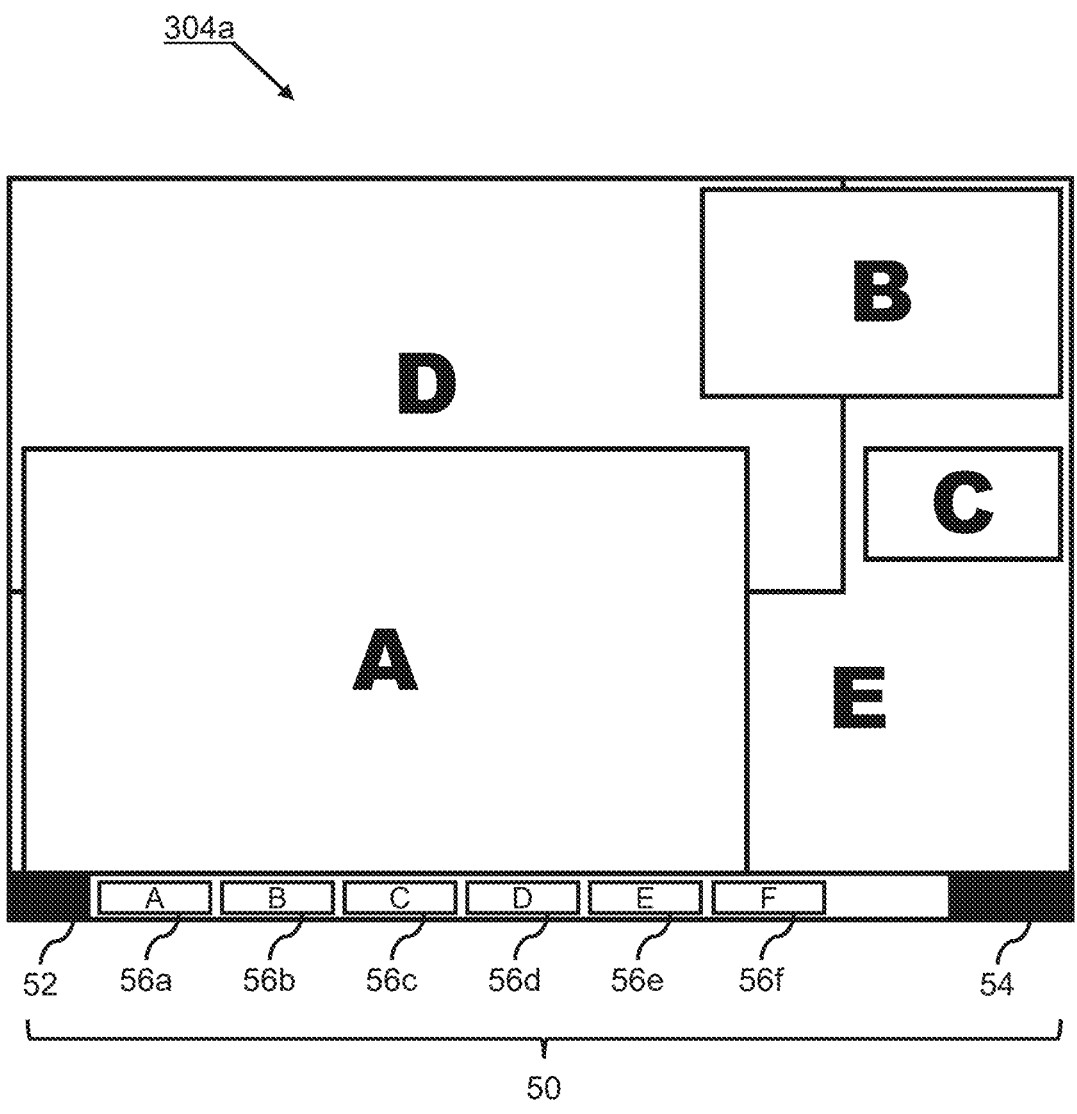
FIG. 4 shows an example of an original image on a display in accordance with one or more embodiments.

FIG. 4 shows an example of an original image 304a on a display 14 in accordance with one or more embodiments.

The display 14 includes a variety of onscreen elements. Each open application running on the computing device may be represented by an application window that presents information to a user of the computing device 10. Each application window A-E may be drawn on the display as a full screen display, bordered window, borderless window, or any appropriate display window. As the user opens more applications, the application windows are drawn in an order such that the currently active window is drawn last (i.e., on top of all other application windows). For example, in FIG. 4, application window E is drawn as a full screen display in the background, application window D is drawn as a bordered window on top of application window E, application window C is drawn as a bordered window on top of application window E (one a layer higher than application window D), application window B is drawn as a bordered window on top of application windows D and E, and application window A is drawn as a bordered window on top of application windows D and E. In FIG. 4, application window F is not drawn because the application window is completely overlapped by application windows in higher drawing layers.

The display 14 further includes a taskbar 50 with various buttons and display for the user to interact with. For example, the taskbar 50 may include one or more of the following: a start menu button 52, a notification area 54, application buttons 56 for each open application (regardless of whether drawn on the screen or not (e.g., minimized, completely overlapped). The taskbar 50 may include more or fewer components depending on the layout configured by the user.

In one or more embodiments, the original image shown in FIG. 4 is modified by the computing device 10 to reduce power consumption of the display 14. The functional system 300 (e.g., implemented by an operating system of the device 10 or graphics driver part of software on the device 10) classifies each onscreen element (e.g., portions of the original image 304a), before it is drawn, based on a current power policy (e.g., display information 304) of the computing device 10. If an onscreen element is classified at or below a predetermined threshold (e.g., another element of the display information 304) of the power policy (e.g., as "needs power savings," "power optimized," a "power usage" class, a "power usage trend" class, or any appropriate classification indicating less priority than another element), it is identified as part of a non-focused region (e.g., by the identification engine 308). In other words, the non-focused region may be identified by using classification information that is based on a power policy of the computing device 10.

The non-focused region is transformed to low bit depth grayscale (e.g., by transformation engine 310). For example, the original image 304a may include 8-bit resolution in three color channels (R255,G255,B255) while the transformation outputs 4-bit resolution data (R16,G16,B16) (i.e., a power reduced color gamut) for the non-focused region. The low bit depth information is inserted into the original image 304*a* to generate the remapped image 304*b* (e.g., by mapping engine 312). Because the non-focused region in the remapped image 304*b* has the low bit depth relative to the full bit depth of the focused portion of the screen, the resulting remapped image 304*b* (e.g., output by the display engine 314) uses much less power than rendering the full color version. In this non-limiting example, only 1/16 of the power is used for each pixel of the non-focused portion of the remapped image 304*b* compared to using the full color gamut. The focused region of the display 14 is unaffected (i.e., maintained at original color range and brightness levels). In one or more embodiments, the low bit depth information is based on the least power consuming color gamut of the color space supported by the display 14.

In other words, by selectively quantizing the colors to a smaller bit depth in the non-focused region, mapping the quantized colors back into a least power consuming range of the full gamut, and outputting the remapped colors on the display (e.g., as a dim grayscale representation in the non-focused region), a low power usage state of the display 14 may be applied without affecting the appearance or usability of power prioritized elements (e.g., classified as "power priority," "performance optimized," or any appropriate classification in the power policy of the computing device 10).

Figure 5:
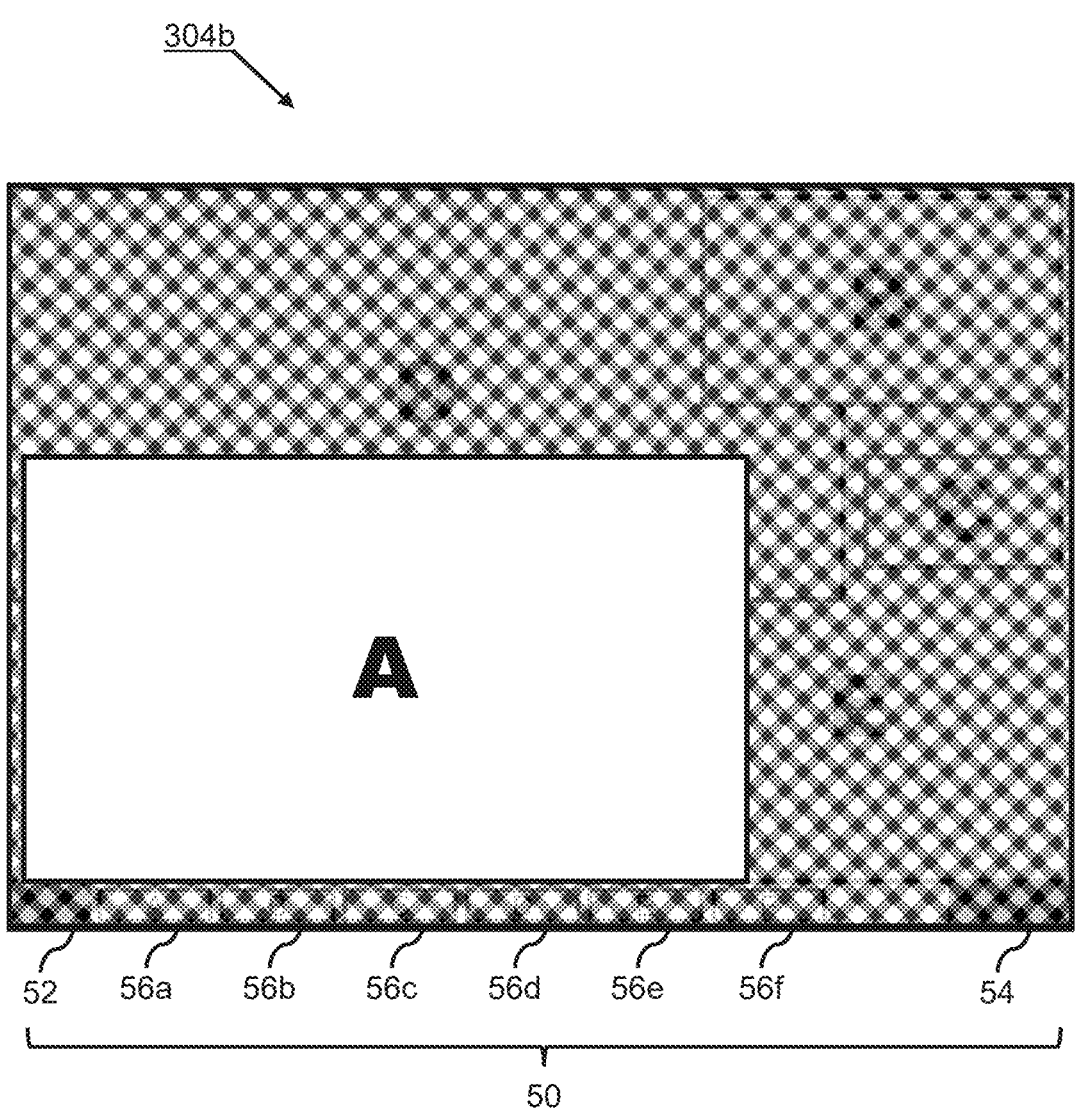
FIG. 5 shows an example of a remapped image in accordance with one or more embodiments.

FIG. 5 shows an example of a remapped image in accordance with one or more embodiments.

In FIG. 5, the active (i.e., currently in use by the user) application window A is identified as a focused region of the original image 304*a* while the remainder of the onscreen elements (i.e., application windows B-E and the entire taskbar 50) are identified as the non-focused region of the original image 304*a*. The active application may be indicated by classification information based on the power policy of the computing device. For example, application window A may be classified at a higher power priority than the remaining onscreen elements because it is in active use.

As a result, the application window A is drawn on the display 14 with the full color gamut of the display 14. According to one or more embodiments, the non-focused region is transformed from the original representation in original image 304*a* (e.g., in the full color gamut of the display 14) to a power reduced color gamut. As described above, the transformation may include multiple transformations. In the non-limiting example shown in FIG. 5, the non-focused region is converted to grayscale and then down sampled from an 8-bit resolution to a 4-bit resolution. In one or more embodiments, the transformation may perform a grayscale process or down sampling process instead of both processes. In one or more embodiments, the down sampling may include multiple different transformations (e.g., different down sampling for different elements of the original image 304*a*, different down sampling for different color channels).

When the transformed color values of the non-focused region are mapped onto the original image 304*a* (i.e., generating the remapped image 304*b*), the display 14 consumes less power due to the transformed color values. In other words, one or more embodiments of the invention reduce the color gamut of the non-focused region to limit power usage by the addressable pixels of the uninteresting parts of the screen. Instead of globally reducing the luminance of the display, which may compromise the usability of the applications or user experience, one or more embodiments of the invention only act upon regions of the display with minimal effect on usability.

Figure 6A:
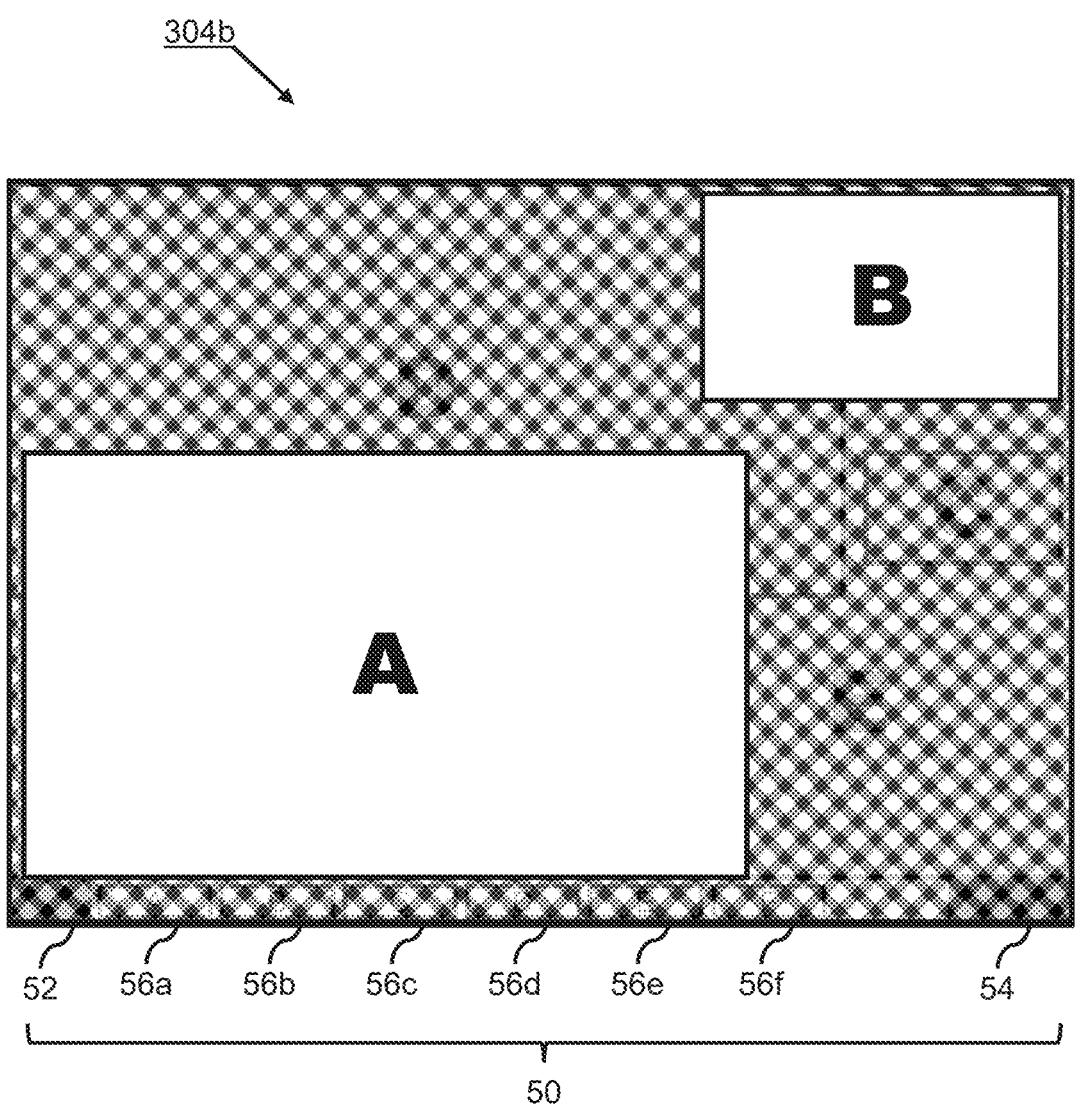
FIGS. 6A-6B show examples of a remapped image in accordance with one or more embodiments.

FIG. 6A show another example of a remapped image in accordance with one or more embodiments.

In one or more embodiments, the non-focused region may be identified by using classification information that is based on a user activity level. For example, activity may be determined based on clicks, movement, typing, relative or absolute processing bandwidth, or any suitable measure of user interaction and recorded in classification associated with each corresponding onscreen element. The classification information produced by tracking user activity may be stored in the display information 304. The classification information may include the current active application window (e.g., window with the most recent user activity), a list on inactive application windows, an ordered list of onscreen elements based time of last activity, an ordered list of onscreen elements based on amount of activity, or any appropriate activity metric to reflect the tendencies of the user. For example, the classification information may be included in an application history log that includes CPU time, network time or bandwidth, memory updates, etc.

In FIG. 6A, the active application window A and the second most recent active application window B are included in the focused region of the original image 304*a*. The remainder of the onscreen elements (i.e., application windows C-E and the entire taskbar 50) are identified as the non-focused region of the original image 304*a*. Therefore, the application windows A and B are drawn with the full color gamut of the display 14 while the non-focused region is drawn with the power reduced color gamut.

Figure 6B:
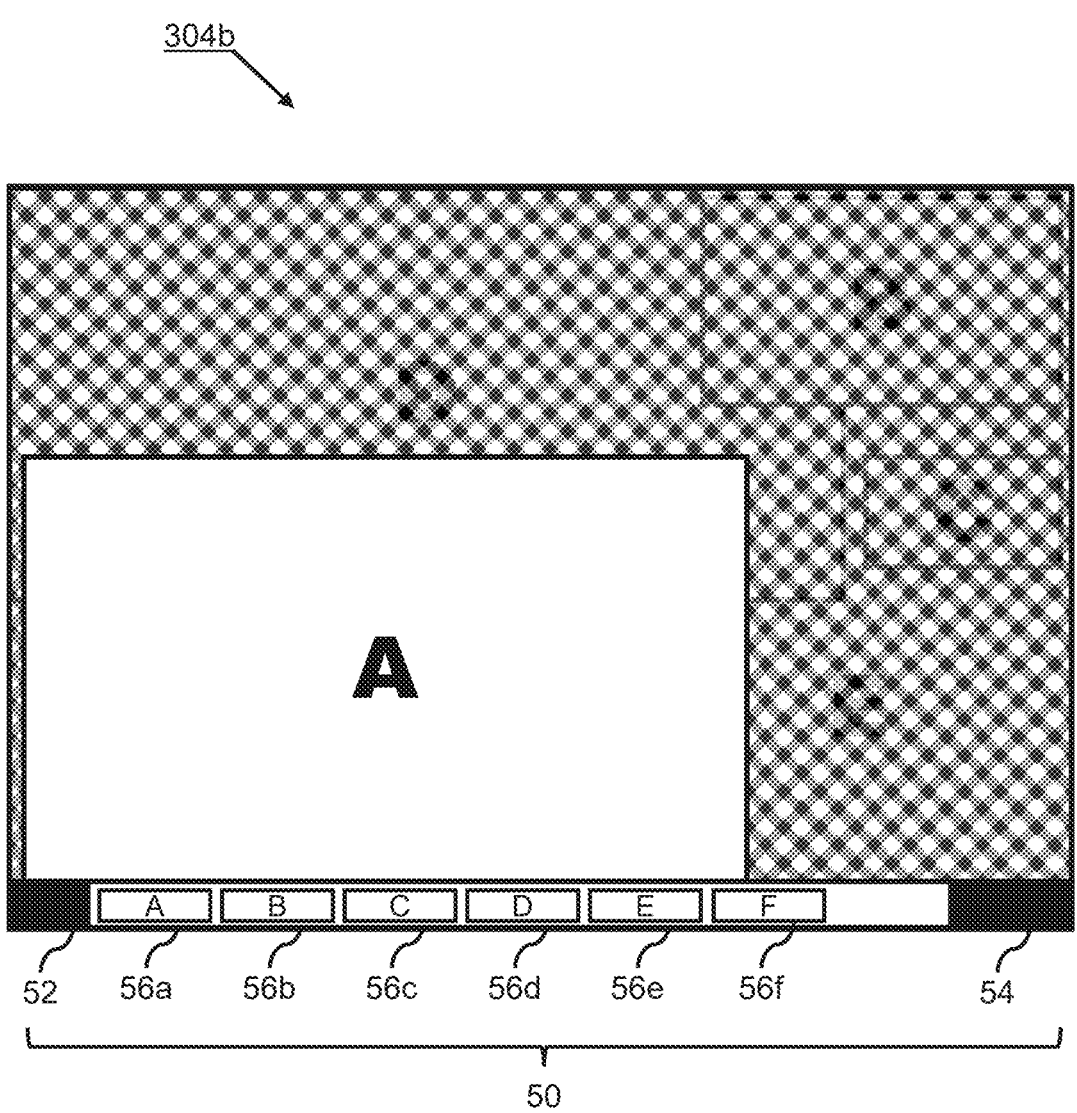

FIG. 6B show another example of a remapped image in accordance with one or more embodiments.

In one or more embodiments, the non-focused region may be identified by using classification information that is based on important features of applications, software, or operating system of the computing device. For example, on a personal computing device, onscreen elements such as the taskbar 50 may be considered instrumental for using of the computing device 10. In one or more embodiments, notifications (e.g., icons, messages, pop-ups, clocks/calendars) in the notification area 54 may be considered an important feature. In one or more embodiments, one or more application buttons 56 on the taskbar 50 may be considered an important feature. Alternatively, or in addition, a region of the display 14 may be required to be active at all times. Therefore, the classification information may include a list of important onscreen elements/windows that may be distinguished from less important elements/windows that are identified as the non-focused region.

In FIG. 6B, the active application window A and the taskbar 50 are included in the focused region of the original image 304*a*. The remainder of the onscreen elements (i.e., application windows B-E) are identified as the non-focused region of the original image 304*a*. Therefore, the application window A and the entire taskbar 50 are drawn with the full color gamut of the display 14 while the non-focused region is drawn with the power reduced color gamut.

Figure 7:
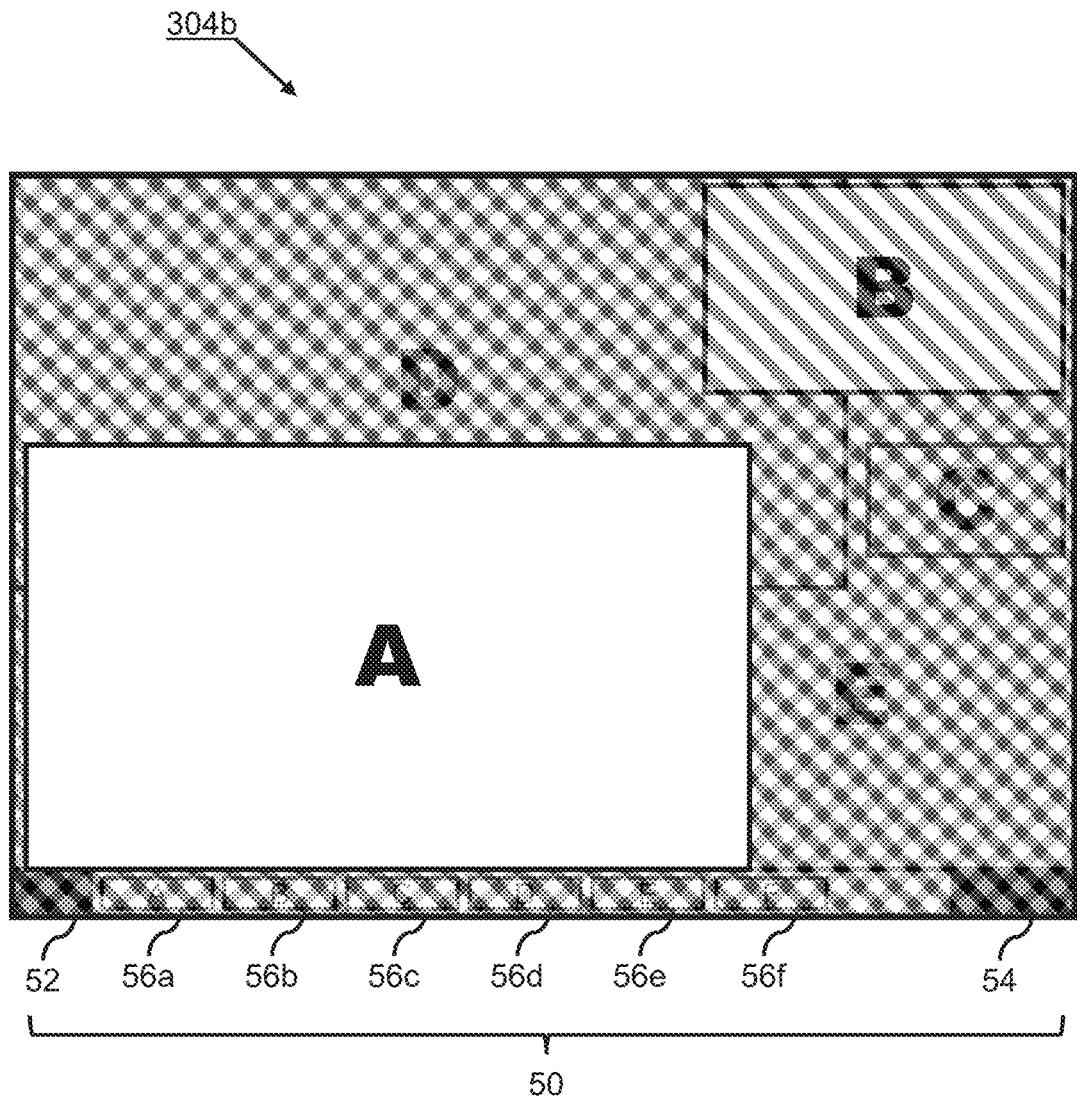
FIG. 7 shows an example of a remapped image in accordance with one or more embodiments.

FIG. 7 shows an example of a remapped image in accordance with one or more embodiments.

In one or more embodiments, a secondary region may be identified for power reduction using a different transform than the non-focused region. In FIG. 7, application window B is separated from the focused region (i.e., application window A) and non-focused region (i.e., application windows C-E and the taskbar 50) of the original image 304. For example, the secondary region may be identified based on the second most recent active element on the screen, an intermediate tier of power priority, a classification information that is different than the focused and non-focused regions. Therefore, one or more embodiments of the invention may visually distinguish the secondary region from the focused and non-focused regions with a secondary color gamut that is different from both the full color gamut of the display 14 and the power reduced color gamut. Similar to the power reduced color gamut, the secondary color gamut may be based on one or more transformations 306 (e.g., monochromatic transform, grayscale transform, down sample transform, any other color gamut transform, or any combination thereof). The secondary color gamut may have higher or lower range and/or luminance than the power reduced color gamut.

In FIG. 7, the application window A is included in the focused region, the application window B is included in the secondary region, and the remainder of the onscreen elements (i.e., application windows C-E and the taskbar 50) are included in the non-focused region of the original image 304*a*. Therefore, the application window A is drawn with the full color gamut of the display 14, the application window B is drawn with a secondary color gamut (shown with diagonal hatching), and the non-focused region is drawn with the power reduced color gamut (shown with cross-hatching).

FIG. 8 shows a flowchart of a method 800 in accordance with one or more embodiments of the invention.

At 810, the system 300 identifies a focused region and a non-focused region of an original image.

At 820, the system 300 transforms color values of pixels in the non-focused region from a color gamut of the original image (e.g., the full color range of the display 14) to a power reduced color gamut.

At 830, the system 300 generates a remapped image by remapping the non-focused region of the original image with the transformed color values.

At 840, the system 300 output the remapped image with the full color gamut in the focused region and the power reduced color gamut in the non-focused region.

Figure 9A:
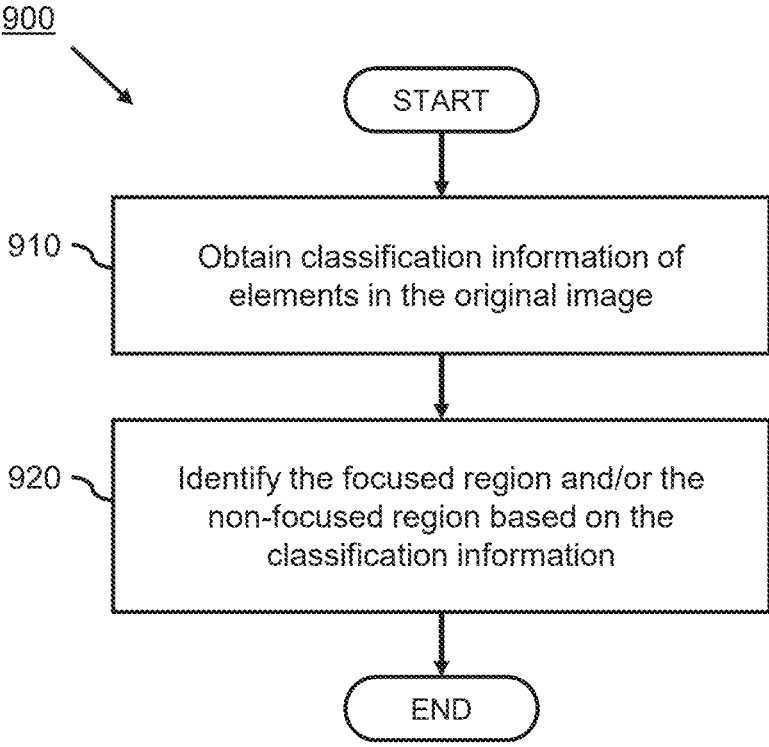

FIG. 9A show a flowchart a method 900 in accordance with one or more embodiments of the invention.

At 910, the system 300 obtains classification information of elements in the original image.

At 920, the system 300 identifies the focused region and/or the non-focused region based on the classification information.

FIG. 9B show a flowchart a method 950 in accordance with one or more embodiments of the invention.

At 960, the system 300 identifies a secondary region of the original image.

At 970, the system 300 transforms color values of pixels in the secondary region from the color gamut of the display to a secondary color gamut.

At 980, the system 300 generates the secondary region of the remapped image using the secondary color gamut.

At 990, the system 300 output the remapped image with the full color gamut in the focused region, the power reduced color gamut in the non-focused region, and the secondary color gamut in the secondary region.

One or more of the individual processes shown in FIGS. 8, 9A, and 9B may be omitted, repeated, and/or performed in a different order than the order shown in this disclosure. For example, the "END" of a method may connect directly to the "START" to execute the method in a continuous loop. Alternatively, or in addition, one or more flowcharts may be combined in one or more embodiments. Accordingly, the scope of the invention should not be limited by the specific arrangement as depicted in FIGS. 8, 9A, and 9B.

Embodiments of the invention may be implemented on virtually any type of computing system 10, regardless of the platform being used. For example, the computing system 10 may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) (e.g., a display 14) to perform one or more embodiments of the invention. For example, the computing system 10 may include one or more computer processor(s), associated memory (e.g., random access memory (RAM), cache memory, flash memory), one or more storage device(s) (e.g., a hard disk, a solid state drive, an optical drive such as a compact disk (CD) drive or digital versatile disk (DVD) drive, a flash memory stick), and numerous other elements and functionalities. The computer processor(s) may be an integrated circuit for processing instructions. For example, the computer processor(s) may be one or more cores, or micro-cores of a processor. The computing system 10 may also include one or more input device(s), such as a camera, imager, touchscreen, keyboard, mouse, microphone, touchpad, electronic pen, or any other type of input device. Further, the computing system 10 may include one or more output device(s), such as a projector, screen (e.g., an OLED display or other pixel addressable display device), an external storage, or any other output device. One or more of the output device(s) may be the same or different from the input device(s). The computing system 10 may be connected to a network (e.g., a local area network (LAN), a wide area network (WAN) such as the Internet, mobile network, or any other type of network) via a network interface connection (not shown). The input and output device(s) may be locally or remotely (e.g., via the network) connected to the computer processor(s), memory, and storage device(s). Many different types of computing systems 10 exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

FIG. 10 shows a comparative example of a dimmed image for a conventional backlight display.

In a conventional LCD display, a backlight (not shown) is used to illuminate color pixels that are controlled to create an image in the light transmitted through the display 14'. In this comparative system, power is saved by limiting the output of the backlight. However, capping the luminance of the display 14' in this manner directly affects all regions of the display, including any application or region of the display 14' currently in use by the user. The reduced luminance may accelerate frustration or eye fatigue in the user.

One or more of the embodiments of the invention may have one or more of the following improvements to computing devices: increasing battery lifetime of the computing device by reducing power usage of a display; and providing a low power display mode with higher graphical fidelity in non-focused regions of the display. These advantages further demonstrate a practical application by improving power usage of a display while maintaining a user experience level of a computing system.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method of operating a display of a computing device, the method comprising:

obtaining classification information of elements in an original image, wherein the classification information is a power usage class based on a power policy of the computing device;

identifying a focused region and a non-focused region of the original image, wherein the non-focused region includes all elements in the original image with power usage class at or below a predetermined threshold of the power policy;

transforming color values of pixels in the non-focused region from a color gamut of the original image to a power reduced color gamut;

generating a remapped image by remapping the non-focused region of the original image with the transformed color values; and outputting the remapped image on the display with the color gamut in the focused region and the power reduced color gamut in the non-focused region.

2. The method of claim 1, wherein the elements in the original image correspond to application windows, and the classification information is based on a level of activity for each corresponding application window.

3. The method of claim 2, wherein the focused region includes an active application window with classification information above a predetermined activity threshold, and the non-focused region includes an inactive application window with classification information at or below the predetermined activity threshold.

4. The method of claim 1, further comprising:

identifying a secondary region of the original image; and transforming color values of pixels in the secondary region from the color gamut of the original image to a secondary color gamut, wherein the secondary region of the remapped image is output with the secondary color gamut, and the secondary color gamut is different from the power reduced color gamut.

5. The method of claim 1, wherein the power reduced color gamut has a lower bit depth than the color gamut of the display.

6. The method of claim 5, wherein the power reduced color gamut is a grayscale version of the color gamut of the display.

7. A non-transitory computer readable medium (CRM) storing computer readable program code for operating a display of a computing device, the computer readable program code causes the computing device to:

obtain classification information of elements in an original image, wherein the classification information is a power usage class based on a power policy of the computing device;

identify a focused region and a non-focused region of the original image, wherein the non-focused region includes all elements in the original image with power usage class at or below a predetermined threshold of the power policy;

transform color values of pixels in the non-focused region from a color gamut of the original image to a power reduced color gamut;

generate a remapped image by remapping the non-focused region of the original image with the transformed color values; and output the remapped image on the display with the color gamut in the focused region and the power reduced color gamut in the non-focused region.

8. The non-transitory CRM of claim 7, wherein the elements in the original image correspond to application windows, and the classification information is based on a level of activity for each corresponding application window.

9. The non-transitory CRM of claim 8, wherein the focused region includes an active application window with classification information above a predetermined activity threshold, and the non-focused region includes an inactive application window with classification information at or below the predetermined activity threshold.

10. The non-transitory CRM of claim 7, wherein the computer readable program code further causes the computing device to:

identify a secondary region of the original image; and transform color values of pixels in the secondary region from the color gamut of the original image to a secondary color gamut, the secondary region of the remapped image is output with the secondary color gamut, and the secondary color gamut is different from the power reduced color gamut.

11. The non-transitory CRM of claim 7, wherein the power reduced color gamut has a lower bit depth than the color gamut of the display.

12. The non-transitory CRM of claim 11, wherein the power reduced color gamut is a grayscale version of the color gamut of the display.

13. A computing device comprising:

a display; and a processor coupled to the display, wherein the processor is configured to:

obtain classification information of elements in an original image, wherein the classification information is a power usage class based on a power policy of the computing device;

identify a focused region and a non-focused region of the original image, wherein the non-focused region includes all elements in the original image with a power usage class at or below a predetermined threshold of the power policy;

transform color values of pixels in the non-focused region from a color gamut of the original image to a power reduced color gamut;

generate a remapped image by remapping the non-focused region of the original image with the transformed color values; and output the remapped image on the display with the color gamut in the focused region and the power reduced color gamut in the non-focused region.

14. The computing device of claim 13, wherein the elements in the original image correspond to application windows, and the classification information is based on a level of
activity for each corresponding application window.

* * * * *